3,154,351
ENDLESS TRACK UNIT
Emmitt M. Tucker, Sr., Medford, Oreg., assignor to Tucker & Sons, Grass Valley, Calif., a corporation of California
Filed Mar. 29, 1963, Ser. No. 268,930
3 Claims. (Cl. 305—48)

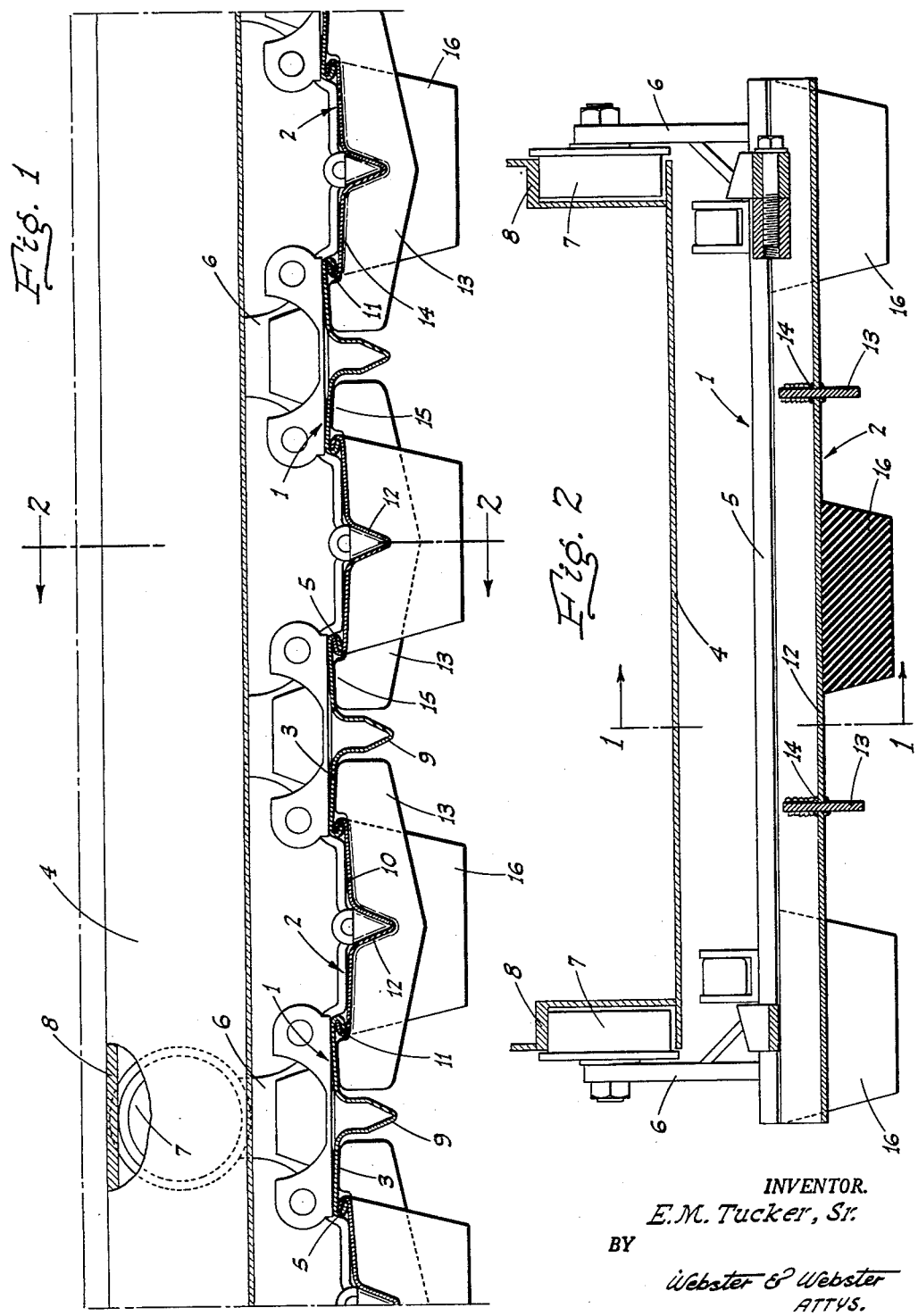

This invention relates in general to endless tracks such as are used on crawler type tractors, and in particular to a track unit especially designed, but not limited, for use on a snow traversing vehicle of the kind known as a SNO-CAT and wherein each endless track unit is mounted on and travels about a pontoon.

The track unit, of the present invention, represents improvements over the unit shown in my United States Patent No. 3,051,531, dated August 28, 1962.

Such previous track unit included rail guided rollers mounted on alternate track links and disposed above the same when in the lower or ground engaging run; the various links of the unit being of course flexibly or pivotally connected together so that the unit may turn about the ends of the supporting pontoon.

With this and similar track mounting arrangements, it has been found that when running on uneven terrain, the track links swivel relative to each other, causing the corresponding rollers to rock or swing back and forth. This action had a tendency to cause the rollers to bind when starting to move up at the end of the pontoon, and thus prevented the desired continuously smooth movement of the track unit about the pontoon from being obtained.

It is therefore the major object of the present invention to eliminate the above noted objectionable feature of operation by providing stabilizing means on the endless track unit arranged so that the various track links, when in the lower or ground engaging run, are maintained in rigid relation with each other irrespective of ground irregularities, and yet without interfering with the desired flexing and smooth turning of the track unit about the pontoon at the ends thereof.

A further object of the invention is to provide the endless track unit with cushion pads, mounted on certain ones of the track links in such a manner that a very smooth operating track on hard surfaces is provided, and so that such surfaces, such as concrete or macadam roadways, will not be harmed by contact with the metal parts of said endless track unit.

A further object of the invention is to provide an endless track unit which is designated for ease and economy of manufacture.

A still further object of the invention is to provide a practical, reliable, and durable endless track unit, and one which is exceedingly effective for the purpose for which it is designed.

These objects are accomplished by means of such structure and relative arrangement of parts as will fully appear by a perusal of the following specification and claims.

In the drawings:

FIG. 1 is a fragmentary longitudinal section of the lower run of the stabilizer equipped endless track unit as mounted on the supporting pontoon; the view being taken on line 1—1 of FIG. 2.

FIG. 2 is a transverse section on line 2—2 of FIG. 1.

Referring now more particularly to the drawings and to the characters of reference marked thereon, the endless track unit, as here shown, is generally the same as that disclosed in my United States Patent No. 3,051,531 and includes a plurality of main track sections or links indicated generally at 1, and a like number of secondary or connecting sections or links indicated generally at 2 and arranged in alternating relation to the links 1.

By reference to the parts, in the lower run, as shown, each link 1 comprises a relatively wide tread plate 3 which is somewhat wider than the pontoon 4 on which the track unit is mounted. At its ends, each tread plate 3 is formed with downturned draft hooks 5 disposed in facing relation to each other. Each link 1 also includes upstanding brackets 6 adjacent the sides thereof, and which support rollers 7 disposed laterally inward of the brackets and engaging rails 8 formed on and extending about the pontoon 4. Additionally each tread plate 3 is formed with a full-width, centrally located, depending traction cleat 9.

Each link 2 comprises a tread plate 10 of the same general dimensions as the plate 3 of each link 1. The plate 10 is formed at its ends with up-turned draft hooks 11 disposed in facing relation to each other, and which engage in the hooks 5 of adjacent links 1. The cooperating hooks are shaped so that the tread plates of adjacent links may have a certain amount of swivel movement relative to each other, as is necessary to enable the endless track unit as a whole to pass about the curved end portions of the pontoon rails 8. Each tread plate 10— which is of heavy sheet metal—is also formed with a full-width, centrally disposed, depending, V-shaped (and thus hollow) traction cleat 12.

The cooperating hooks 5 and 11 form, in effect, pivotal connections between adjacent links, and due to the presence of the necessary ground engaging traction cleats on the links, there is a tendency at times, and depending somewhat on the ground conditions encountered by the different cleats, for the related links to tilt or teeter relative to each other. This movement caused the brackets 6 of the main links 1, and the rollers thereon, to swing back and forth, and tended to prevent the desirable smooth movement of the track unit from each straightaway of the track onto the curved end portions thereof.

This undesired teetering movement of the track links is prevented by the stabilizing means now to be described, and which forms a major object of the present invention.

Such stabilizing means comprises, for each link 2, rigid longitudinally extending plates 13, two of such plates being preferably used, spaced apart transversely on opposite sides of the transverse center of the related tread plate 10. Each stabilizer plate 13, which is considerably longer than the tread plate 10, passes through the related traction cleat 12, which is cut away to receive such stabilizer plate; the latter being materially deeper than the cleat so that its lower edge is below the cleat, as clearly shown.

The upper edge of each stabilizer plate 13, for the length of the tread plate 10, abuts against and is welded to the underside thereof, and is also welded, as indicated at 14, to the sides of the traction cleat 12, as shown in FIG. 2.

Beyond the tread plate 10, the stabilizer plate 13 is formed with upstanding shoulders 15, which substantially normally abut against, but are not secured to, the underside of the tread plates 3 of adjacent track links 1, for substantially the full distance between the hooks 11 of the tread plate 10 and the traction cleats 9 of such adjacent plates 3.

By reason of this arrangement, the tread plates of the adjacent track links 1 and 2 are prevented from teetering movement relative to each other as long as said links are moving along the straight portion of the rails 8, and the corresponding portion of the endless track unit has full bearing engagement throughout its length with the surface being traversed. It will also be seen that since the stabilizer plates are elongated, and depend at right angles to the tread plates of the links, said stabilizer plates function effectively to prevent side slippage of the tracks when the vehicle is traversing side hills.

Also, it will be seen that since the stabilizer plates are welded to the hollow V-shaped traction cleats 12, the latter are prevented from possibly pulling apart or becoming widened, with a heavy pull, and which would otherwise cause the track unit to be stretched. It may here be noted that this stretching problem is not had with the main track links 1, since the traction cleats 9 in these links are bridged and strengthened by the rigid brackets 6 and other features of construction of such links.

Another feature of construction of the endless track unit which assures of smooth operation, is the provision thereon of what may be termed combination traction and tread pads 16, of compressible material such as a suitable grade of rubber. These pads are of square form in plan, and of frusto-pyramidal form in elevation. Two of these pads are vulcanized on and depend from the tread plate 10 of all the alternate ones of the links 2 at the sides thereof and in straddling relation to the related traction cleat 12 as shown. The width of the pads at their large tread-plate engaging end is approximately the same as the length of the tread plate 10. Also, each pad is materially deeper than the related traction cleat and stabilizer plates.

A single one of the pads 16 is also vulcanized to each of the intermediate ones of the links 2, in straddling relation to the related cleat 12, and centrally of the width of such link, between the corresponding stabilizing plates 13, as shown in FIG. 2.

These pads add a tractive effort to the track unit when working in soft dirt or snow, their tapering form enabling the pads to pull out from such dirt or snow without resistance when the track unit starts to turn upwardly about the pontoon 4. The pads also improve side hill traction, as well as providing a support for the track unit when traversing a hard road surface which might be damaged by contact with the traction cleats. Further, by placing the pads on adjacent ones of the links 2, so that a three-point support is provided, a smoother operating track is had than would otherwise be the case.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. In an endless track unit, a plurality of links, means pivoting the links together at adjacent ends, each link including a tread plate, and a longitudinally extending stabilizer plate on each alternate link; said stabilizer plate being secured against and depending from the underside of the tread plate of such link and projecting beyond both ends thereof, the projecting end portions of the stabilizer plate normally bearing against the adjacent underside portions of the tread plates of adjacent links, each such alternate link including a traction cleat depending from the related tread plate intermediate the ends thereof; the stabilizer plate cutting through said cleat and being welded thereto.

2. In an endless track unit which includes a plurality of links and means pivoting the links together at adjacent ends, each link including a relatively wide tread plate; a pair of longitudinally extending stabilizer plates on each alternate link, said stabilizer plates depending in vertical planes from the underside of the tread plate of such link and projecting beyond both ends thereof, and such stabilizer plates being transversely spaced from each other a distance less than the width of the tread plates of the links and secured to the tread plate of the related link for substantially the full length thereof; the projecting end portions of the stabilizer plates normally bearing against the adjacent underside portions of the tread plates of adjacent links for susbtantially one-half the length of each such link.

3. In an endless track unit, a plurality of links, means pivoting the links together at adjacent ends, each link including a tread plate, and a longitudinally extending stabilizer plate on each alternate link; said stabilizer plate being secured against and depending from the underside of the tread plate of such link and projecting beyond both ends thereof, the projecting end portions of the stabilizer plate normally bearing against the adjacent underside portions of the tread plates of adjacent links; the stabilizer plate being disposed on edge and relatively narrow in a vertical plane whereby to aid in preventing lateral slippage of the track unit.

References Cited in the file of this patent

UNITED STATES PATENTS

| | | |
|---|---|---|
| 135,240 | Minniss | Jan. 28, 1873 |
| 1,278,150 | Houghton | Sept. 10, 1918 |
| 1,296,512 | Hatfield | Mar. 4, 1919 |
| 1,315,299 | Gregory | Sept. 9, 1919 |
| 1,707,953 | Winsor | Apr. 2, 1929 |
| 2,309,793 | Sedore et al. | Feb. 2, 1943 |
| 2,458,078 | Johnson et al. | Jan. 4, 1949 |